(12) United States Patent
Hotta et al.

(10) Patent No.: US 10,899,309 B2
(45) Date of Patent: Jan. 26, 2021

(54) AIRBAG

(71) Applicants: TOYODA GOSEI CO., LTD., Kiyosu (JP); HONDA MOTOR CO., LTD., Tokyo (JP)

(72) Inventors: Masashi Hotta, Kiyosu (JP); Koji Kawamura, Kiyosu (JP); Tetsuhiro Arima, Wako (JP)

(73) Assignees: TOYODA GOSEI CO., LTD., Aichi-pref. (JP); HONDA MOTOR CO., LTD., Tokyo (JP)

( * ) Notice: Subject to any disclaimer, the term of this patent is extended or adjusted under 35 U.S.C. 154(b) by 94 days.

(21) Appl. No.: 16/234,698

(22) Filed: Dec. 28, 2018

(65) Prior Publication Data
US 2019/0217806 A1 Jul. 18, 2019

(30) Foreign Application Priority Data
Jan. 12, 2018 (JP) ................................. 2018-003465

(51) Int. Cl.
*B60R 21/2338* (2011.01)
*B60R 21/203* (2006.01)
*B60R 21/233* (2006.01)

(52) U.S. Cl.
CPC ........ *B60R 21/2338* (2013.01); *B60R 21/203* (2013.01); *B60R 21/233* (2013.01); *B60R 2021/23308* (2013.01); *B60R 2021/23382* (2013.01)

(58) Field of Classification Search
CPC ........ B60R 2021/23571; B60R 21/233; B60R 21/203; B60R 2021/23308; B60R 2021/23382; B60R 21/2338
USPC ........................................................ 280/731
See application file for complete search history.

(56) References Cited

U.S. PATENT DOCUMENTS

| | | | | |
|---|---|---|---|---|
| 5,957,485 | A * | 9/1999 | Hirai | B60R 21/233 280/729 |
| 6,254,121 | B1 * | 7/2001 | Fowler | B60R 21/233 280/729 |
| 6,536,801 | B2 * | 3/2003 | Frisch | B60R 21/2165 280/728.2 |

(Continued)

FOREIGN PATENT DOCUMENTS

| | | |
|---|---|---|
| JP | S49-135334 A | 12/1974 |
| JP | 2007-176211 A | 7/2007 |

(Continued)

OTHER PUBLICATIONS

Machine Translation of WO-2019008740-A1 (Year: 2019).*
Machine Translation of JP-2018075970-A (Year: 2018).*

*Primary Examiner* — James A English
*Assistant Examiner* — Kurtis Nielson
(74) *Attorney, Agent, or Firm* — Posz Law Group, PLC

(57) ABSTRACT

An airbag is formed by joining outer edges of an occupant-side wall and a vehicle-side wall each of which is made of a base cloth having flexibility. The occupant-side wall and vehicle-side wall are equal in circumferential length of the outer edge. The occupant-side wall includes a recessed region for receiving a head of a vehicle occupant and an annular raised region that surrounds the recessed region. At least one of the occupant-side wall and the vehicle-side wall includes at least one shortening region that reduces a circumferential length of an outer edge of the base cloth.

2 Claims, 13 Drawing Sheets

(56) References Cited

U.S. PATENT DOCUMENTS

| | | | |
|---|---|---|---|
| 6,612,609 B1* | 9/2003 | Rodriguez | B60R 21/201 |
| | | | 280/729 |
| 7,195,275 B2* | 3/2007 | Abe | B60R 21/231 |
| | | | 280/729 |
| 8,608,199 B2 | 12/2013 | Fischer et al. | |
| 2005/0062270 A1* | 3/2005 | Kai | B60R 21/2035 |
| | | | 280/731 |
| 2005/0236823 A1* | 10/2005 | Schuetz | B60R 21/2338 |
| | | | 280/743.2 |
| 2008/0129022 A1* | 6/2008 | Dennis | B60R 21/233 |
| | | | 280/728.2 |
| 2009/0020991 A1* | 1/2009 | Abe | B60R 21/2338 |
| | | | 280/739 |
| 2011/0210533 A1* | 9/2011 | Adachi | B60R 21/217 |
| | | | 280/728.2 |
| 2011/0241323 A1* | 10/2011 | Naganawa | B60R 21/203 |
| | | | 280/731 |
| 2013/0234423 A1* | 9/2013 | Higuchi | B60R 21/239 |
| | | | 280/742 |
| 2014/0097602 A1* | 4/2014 | Nam | B60R 21/2338 |
| | | | 280/743.1 |
| 2016/0221524 A1* | 8/2016 | Sekino | B60R 21/235 |
| 2016/0250993 A1 | 9/2016 | Nagatani et al. | |
| 2020/0101928 A1* | 4/2020 | Ishii | B60R 21/235 |

FOREIGN PATENT DOCUMENTS

| | | | |
|---|---|---|---|
| JP | 2015-058919 A | 3/2015 | |
| JP | 2016-016730 A | 2/2016 | |
| JP | 2018-075970 A | 5/2018 | |
| JP | 2018075970 A * | 5/2018 | |
| WO | WO-2019008740 A1 * | 1/2019 | B60R 21/231 |

* cited by examiner

AIRBAG

CROSS REFERENCE TO RELATED APPLICATIONS

The Present application claims priority from Japanese Patent Application No. 2018-003465 of Hotta et al., filed on Jan. 12, 2018, the entire disclosure of which is incorporated herein by reference.

BACKGROUND OF THE INVENTION

1. Field of the Invention

The present invention relates to an airbag for use in an airbag device which is mountable on a vehicle for restraining a vehicle occupant such as a driver and a passenger in the event of an impact of the vehicle.

2. Description of Related Art

JP 2016-016730 A, by way of example, discloses a known airbag for restraining a head of a vehicle occupant. The airbag includes, in its outer shell as deployed, an occupant-facing region (or occupant-side wall) for catching the occupant. The occupant-facing region includes a recessed region for receiving the occupant's head, which is disposed generally at the center, and an annular raised region, which is disposed around the recessed region. If the occupant's head is thrown against the recessed region of the airbag as deployed, the airbag is able to catch a front face and sides of the head with the recessed region and raised region. Therefore, this airbag is able to protect the occupants head adequately without turning the head sideways.

The outer shell of the above airbag is formed by sewing a plurality of base cloths together, and a plurality of tethers are disposed inside the airbag for shaping the airbag as deployed in a desired contour that includes the recessed region and raised region. Without these tethers, the airbag would be inflated into a generally spherical contour. The tethers are classified into two kinds; a vertical tether and a transverse tether. The vertical tether is disposed in a vicinity of an outer circumference of a bottom plane of the recessed region for making the recessed region recessed and regulating a height of the airbag as deployed. The transverse tether connects a vicinity of the outer circumference of the bottom plane of the recessed region to a side surface of the airbag for regulating a width or an outer diameter of the airbag as deployed. The above conventional airbag includes four each vertical tethers and transverse tethers, and each of the vertical tethers and each of the transverse tethers extend orthogonally to each other from the vicinity of the outer circumference of the bottom plane of the recessed region.

The airbag with the above configuration is difficult to manufacture because the vertical tethers and transverse tethers have to be arranged in a predetermined fashion while the plurality of base cloths are sewn together into a bag shape. Here, it would be conceivable to provide an airbag with the vertical tethers only for forming a recessed region. However, with no transverse tethers, the airbag would be expanded outwardly and the height as deployed, especially a height of the raised region disposed around the recessed region, would be suppressed and insufficient. That way a cushioning property at the raised region as well as the recessed region would not be enough to restrain the occupant safely.

SUMMARY OF THE INVENTION

An object of the present invention is to provide an airbag that has a sufficient thickness as inflated despite the presence of a recessed region for receiving an occupant's head, and that is easy to produce.

An outer shell of the airbag of the invention is formed by joining outer circumferential edges of an occupant-side wall and a vehicle-side wall each of which is made of a base cloth having flexibility. The occupant-side wall and the vehicle-side wall are equal in circumferential length of the outer circumferential edge. The vehicle-side wall includes an opening that is disposed in a vicinity of a center of the vehicle-side wall for receiving an inflation gas, and a mounting region that is disposed in a periphery of the opening to be mounted on the vehicle. The occupant-side wall includes a recessed region that is disposed in a vicinity of a center of the occupant-side wall as inflated for receiving a head of a vehicle occupant, and a raised region that is raised in an annular shape in a circumference of the recessed region at airbag inflation. The airbag includes a plurality of tethers for limiting a clearance between the occupant-side wall and the vehicle-side wall. Each of the tethers connects a circumference of the mounting region in the vehicle-side wall and the occupant-side wall, the tethers thus forming a bottom plane of the recessed region in the occupant-side wall as inflated. At least one of the occupant-side wall and vehicle-side wall is provided with at least one shortening region that reduces the circumferential length of the outer circumferential edge of the base cloth.

In the airbag of the invention, at least one of the occupant-side wall and vehicle-side wall is provided with the shortening region which reduces the circumferential length of the outer circumferential edge of the base cloth. By reducing the circumferential length of the outer circumferential edge of the base cloth, the shortening region limits an outer diameter of the airbag as inflated without reducing a substantial length from the center to the outer edge of the occupant-side wall and/or vehicle-side wall (i.e. while keeping the substantial length from the center to the outer edge of the occupant-side wall and/or vehicle-side wall long). The airbag thus configured is given a sufficient height from the mounting region to the top of the raised region when inflated. Moreover, since the recessed region is formed in the airbag having the great height, a sufficient height of the raised region is also ensured. With this configuration, when a head of an occupant is thrown into the recessed region, the airbag will be able to restrain the front face and sides of the head smoothly with the recessed region and raised region. As a consequence, the airbag will be able to protect the head adequately without turning the head sideways.

In the airbag of the illustrated embodiment, the tethers connect the occupant-side wall and vehicle-side wall vertically, i.e. along the height of the airbag as inflated. In comparison with a conventional airbag which is provided with not only vertical tethers but also transverse tethers disposed orthogonally thereto, the airbag of the invention includes the vertical tethers only, thus the configuration of the airbag is simple. Further, the number of the tethers is limited. Accordingly, it is easy to form the tethers as well as produce the airbag.

Therefore, the airbag of the invention has a sufficient height or thickness as inflated despite the presence of the recessed region for receiving an occupant's head, and is easy to produce.

In the airbag of the invention, it is desired that the shortening region is disposed in the outer circumferential edges of both of the occupant-side wall and the vehicle-side wall.

With this configuration, the substantial length from the center to the outer edge of the base cloth is made long relative to a given outer diameter of the airbag as inflated in both of the occupant-side wall and the vehicle-side wall, such that the height of the airbag as inflated is further increased. Therefore, the airbag will have a sufficient thickness for cushioning an occupant's head when inflated despite the presence of the recessed region and the raised region disposed around the recessed region.

In the airbag of the invention, it is desired that the occupant-side wall is provided with a plurality of the shortening regions around the recessed region. The base cloth of such an occupant-side wall includes a plurality of V-shaped cut-out regions each of which includes a bottom and a pair of opposing edges that extend from the bottom to the outer circumferential edge of the base cloth, and each of the shortening regions is formed by joining the opposing edges of each of the cut-out regions. A joint of each of the tethers to the occupant-side wall is disposed proximate to the bottom of the cut-out region in each of the shortening regions.

When the shortening region is formed by sewing the opposing edges of the V-shaped cut-out region in the base cloth, the bottom of the cut-out-region is likely to form a projection which protrudes outwardly like a pointed cone. When the airbag is inflated, the projections appear in the periphery of the recessed region in the occupant-side wall. In the airbag configured as described above, however, since each of the tethers is joined proximate to the bottom of the cut-out region, each of the tethers will pull the occupant-side wall at airbag deployment such that a protruding amount of each of the projections is suppressed. As a consequence, the projections will be less represented at airbag deployment, thus will not harm the head of the occupant when the recessed region receives it.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
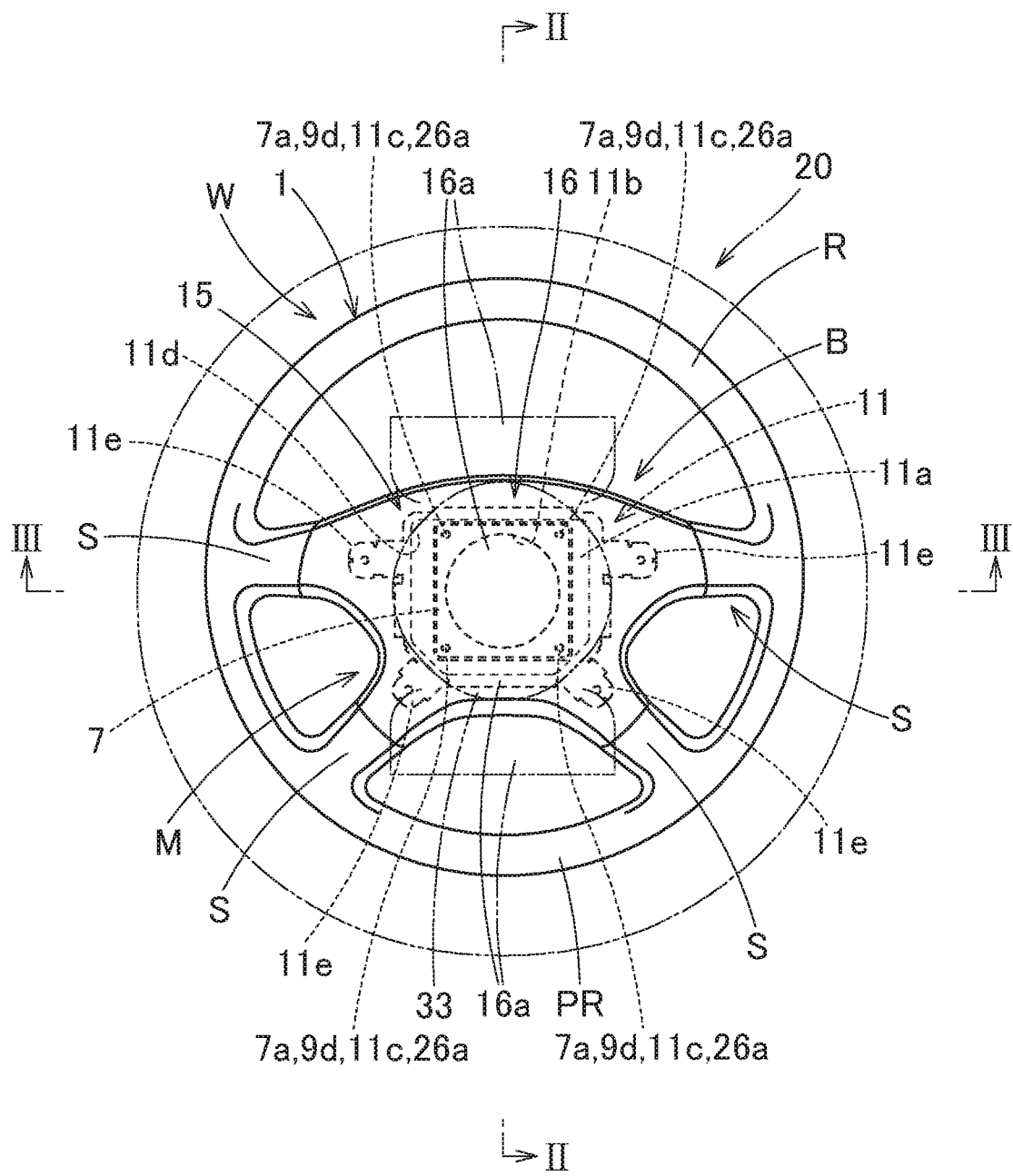
FIG. 1 is a schematic plan view of an airbag device for a driver's seat as mounted on a steering wheel, the airbag device employing an airbag embodying the present invention.
Figure 2:
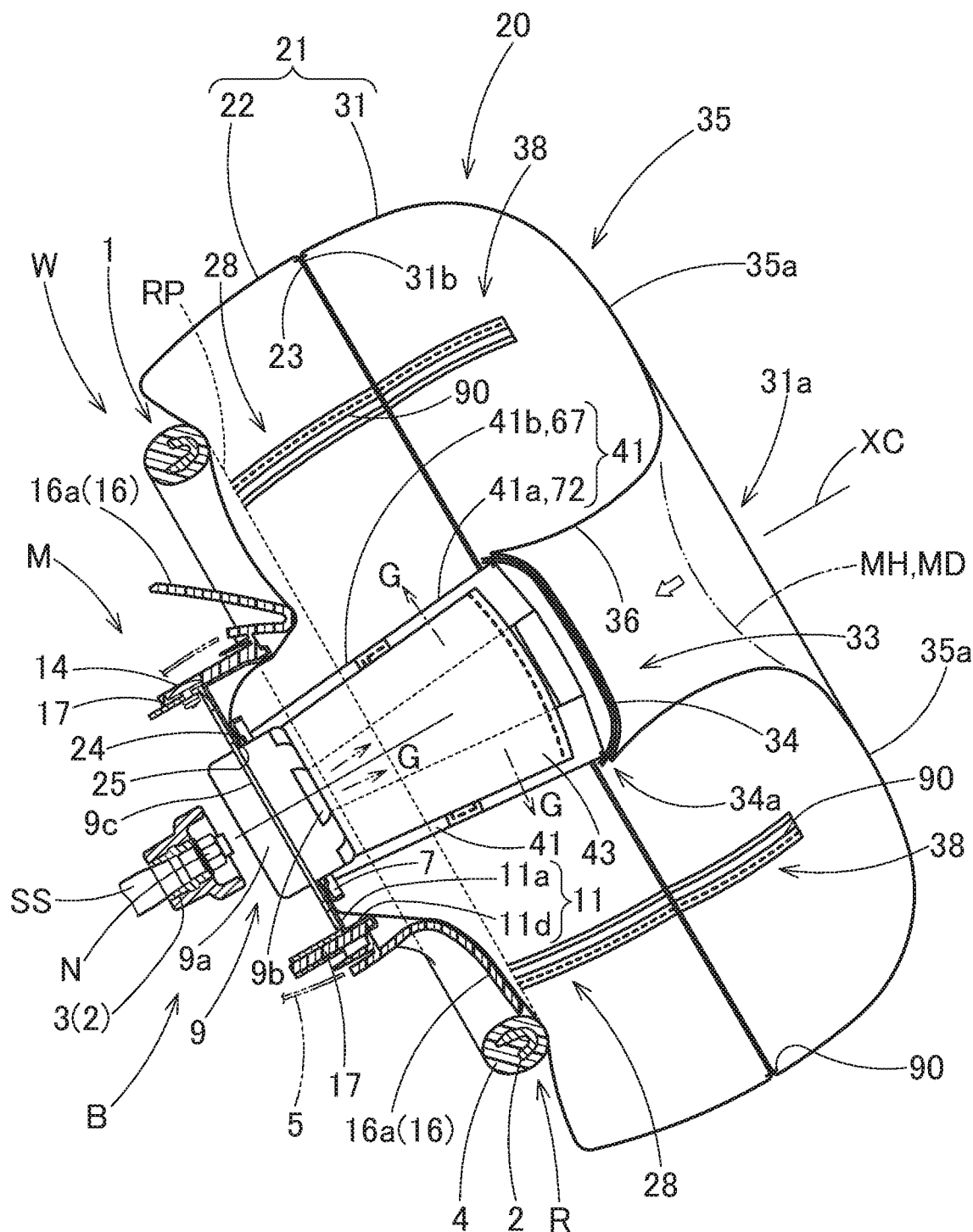
FIG. 2 is a schematic vertical sectional view of the airbag device of FIG. 1 as actuated, taken along line II-II of FIG. 1.
Figure 3:
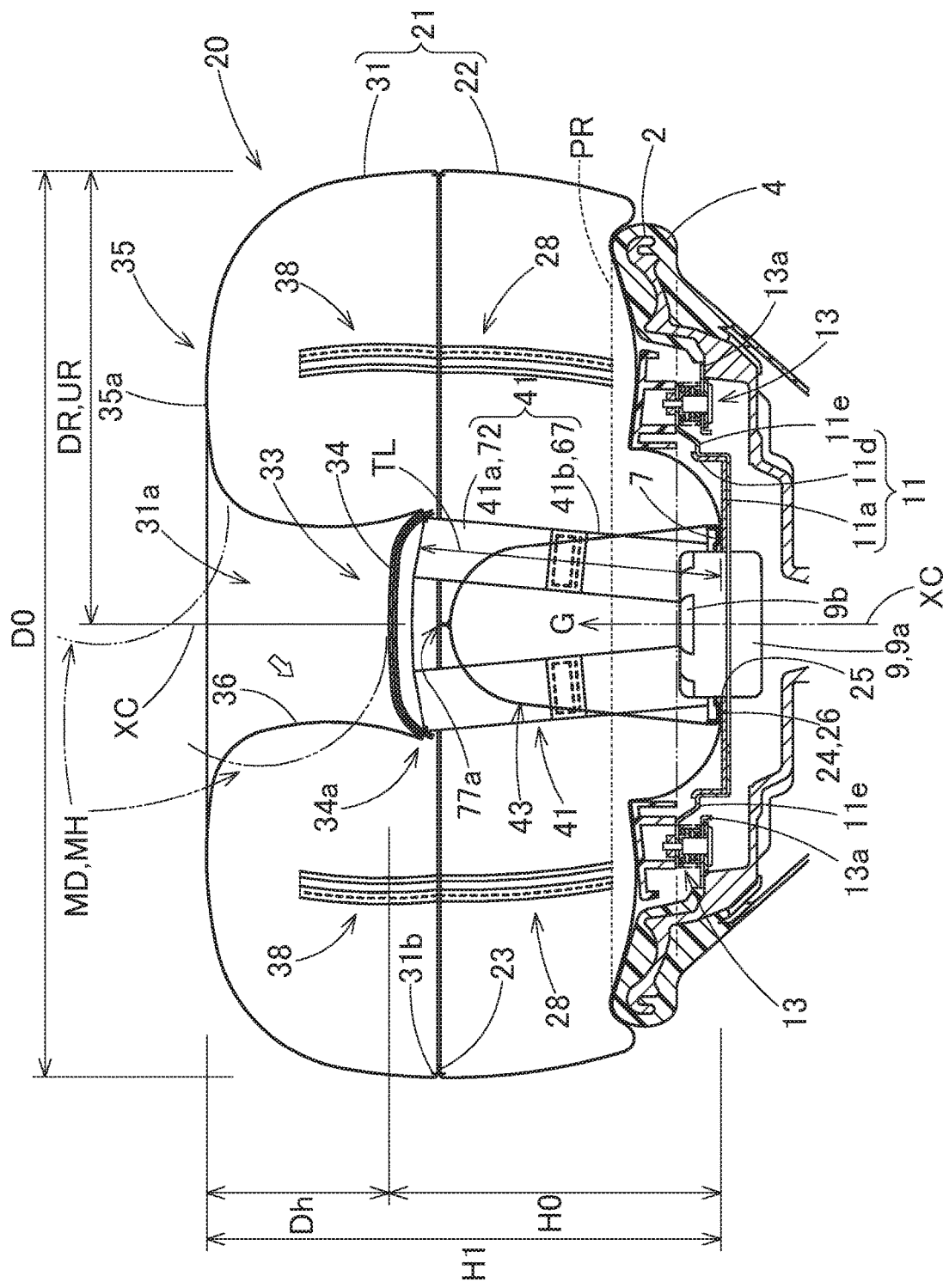
FIG. 3 is a schematic vertical sectional view of the airbag device of FIG. 1 as actuated, taken along line III-III of FIG. 1.

As shown in FIGS. 1 to 3, an airbag 20 embodying the invention is illustrated as an airbag for use in an airbag device M for a driver's seat. The airbag device M is mounted on a steering wheel W. The steering wheel W includes a wheel body 1, and the airbag device M is disposed on top of a boss section B at the center of the wheel body 1. The wheel body 1 includes an annular rim R, the boss section B and four spokes S. The rim R is for holding at steering operation. The boss section B is disposed at the center of the rim R and is secured to a steering shaft SS. The spokes S interconnect the boss section B and the rim R.

In this specification, unless otherwise specified, an up and down direction corresponds to an up and down direction extending along an axial direction of the steering shaft SS. A front and rear direction corresponds to a front and rear direction which is orthogonal to the axial direction of the steering shaft SS as steered straight ahead, and a left and right direction corresponds to a left and right direction which is orthogonal to the axial direction of the steering shaft SS as steered straight ahead.

As shown in FIGS. 1 to 3, the steering wheel body 1 includes a core 2 of such metal as aluminum base alloy, the core 2 has such a contour that the rim R, boss section B and spokes S are interconnected. The core 2 is covered with a cladding layer 4 of synthetic resin on the rim R and regions of the spokes S adjoining the rim R. At a region of the core 2 corresponding to the boss section B is a steel boss 3 through which the steering shaft SS is inserted and then fixed by a nut N. Underneath the wheel body 1 is a lower cover 5 made from synthetic resin for covering a lower side of the boss section B.

As shown in FIGS. 1 to 3, the airbag device M includes an airbag 20 which is folded up, an inflator 9 which supplies the airbag 20 with an inflation gas, an airbag cover 15 which covers an upper side of the airbag 20, a case 11 which houses the airbag 20 and the inflator 9 and supports the airbag cover 15, and a retainer 7 which is used to mount the airbag 20 and inflator 9 on the case 11.

The retainer 7, which is made of a sheet metal, has a square annular contour and holds down a later-described mounting region 24 of the airbag 20. The retainer 7 is provided at the four corners with bolts 7*a*, which are each fastened with not-shown nuts on the underside of the case 11 in order to mount the airbag 20 and the inflator 9 on the case 11.

The inflator 9 includes a body 9*a* and a flange 9*c*. The inflator body 9*a* is in the form of a pot and is provided, on the upper region, with a plurality of gas discharge ports 9*b*. The flange 9*c* protrudes out of an outer circumference of the body 9*a* and has through holes 9*d* for receiving the bolts 7*a* of the retainer 7.

As shown in FIGS. 1 to 3, the case 11 is disposed at an upper region of the boss section B of the steering wheel W, and serves as a housing of the airbag 20. The case 11 is made of sheet metal and formed into a generally rectangular parallelepiped. The case 11 includes a rectangular bottom wall 11*a* and a side wall 11*d* extending upward from an outer peripheral edge of the bottom wall 11*a*. The bottom wall 11*a* is provided with a circular insert hole 11*b* for receiving the body 9*a* of the inflator 9 from the lower side. Around the insert hole 11*b* are four through holes 11*c* (FIG. 1) for receiving the bolts 7*a* of the retainer 7. At the upper end of the side wall 11*d*, there are provided a plurality of mounting sections 11*e* extending outwardly. Mounting bases 13*a* of a horn switch mechanism 13 (FIG. 3) are attached to the mounting sections 11*e*, and the case 11 is secured to the core 2 of the steering wheel W with the aid of the mounting bases 13*a*. As a result, the airbag device M is mounted on the boss section B of the steering wheel body 1 as has been attached to the steering shaft SS. Moreover, a later-described side wall 17 of the airbag cover 15 is attached to the side wall 11*d* of the case 11 with rivets 14 or the like.

As can be seen in FIGS. 1 and 2, the airbag cover 15 is fabricated of synthetic resin and includes a ceiling wall 16 covering the airbag 20 from above and a side wall 17 having a generally square tubular shape extending downwardly from a vicinity of an outer peripheral edge of the ceiling wall 16. The ceiling wall 16 includes two doors 16*a* which are openable forward and rearward when pushed by the airbag 20 as inflated.

Figure 4:
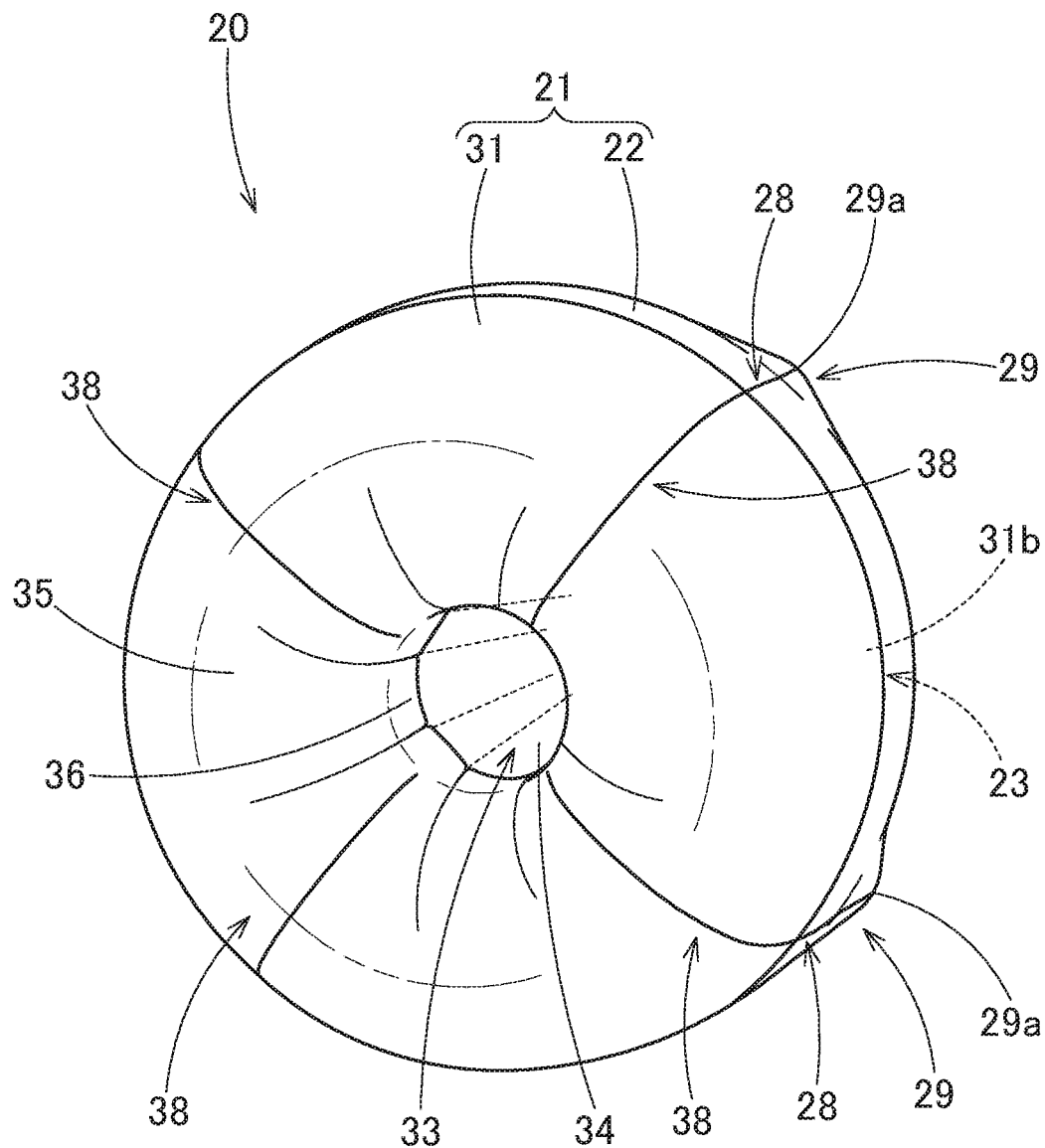
FIG. 4 is a schematic perspective view of the airbag embodying the invention as inflated by itself, especially showing an occupant-side wall (or driver-side wall)

The airbag 20 is made of a fabric woven with polyamide yarn, polyester yarn or the like, and is inflatable into a generally pot-like shape which is round when viewed from above, as shown in FIGS. 2 to 4. An outer shell 21 of the airbag 20 includes a vehicle-side wall 22, which is deployable towards the steering wheel body 1 (i.e. towards the vehicle body or towards the rim R), and an occupant- or driver-side wall 31, which is deployable to face a driver MD (i.e. vehicle occupant).

Figure 5A:
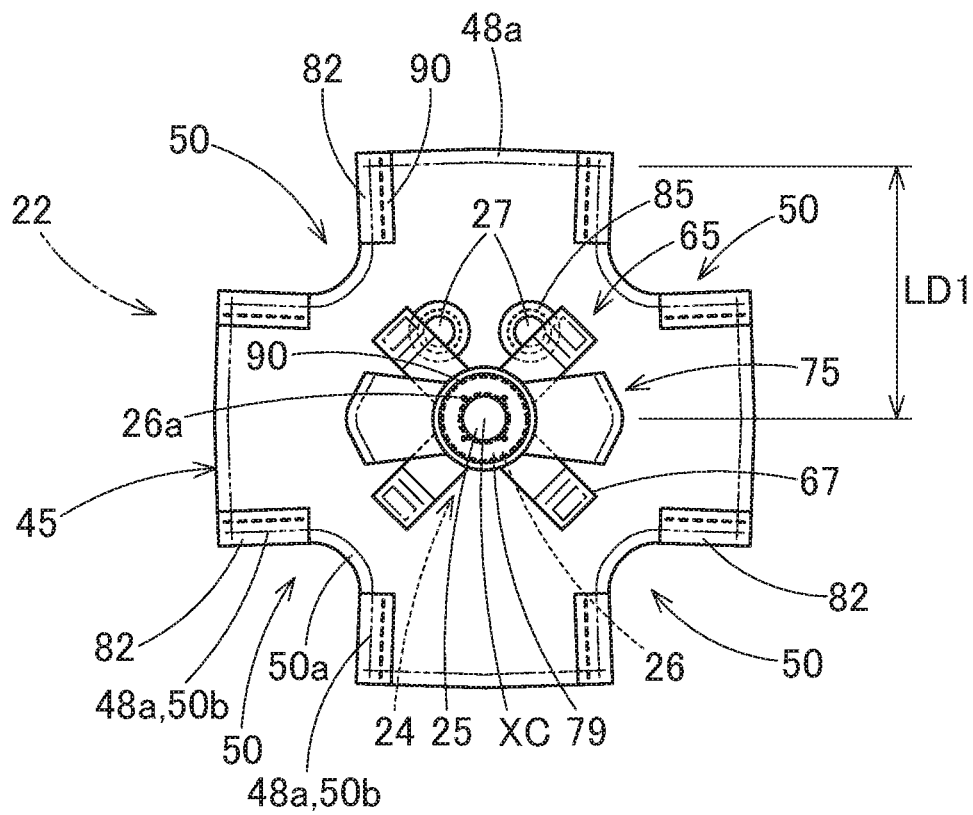
FIG. 5A is a plan view of a base cloth for forming a vehicle-side wall of the airbag of FIG. 4.
Figure 6:
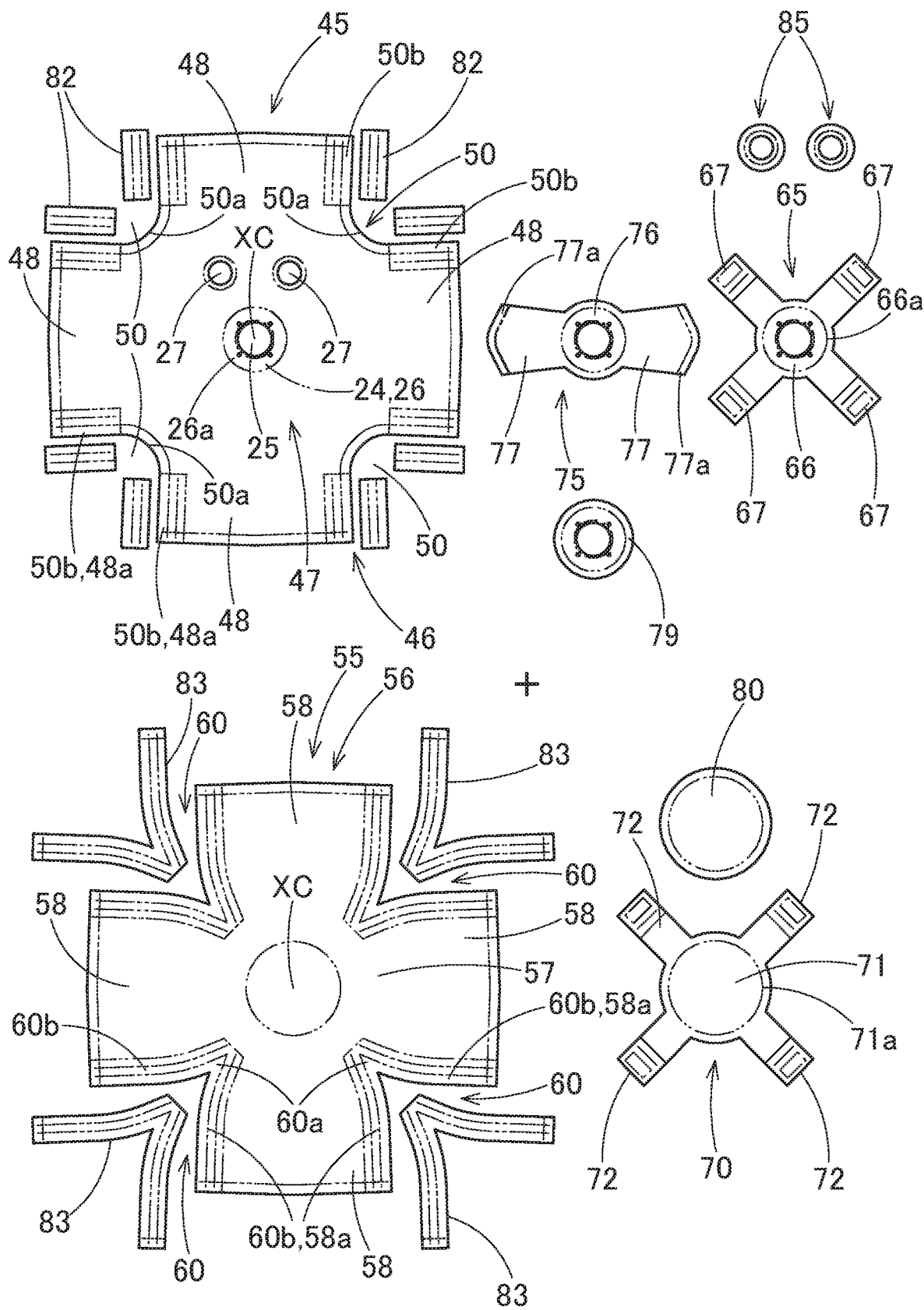
FIG. 6 depicts components of the airbag of FIG. 4 by plan views.

The vehicle-side wall 22 is composed of a vehicle-side base cloth 45 depicted in FIG. 6. The vehicle-side base cloth 45 as laid flat has a generally cruciate contour, and is provided with a mounting region 24 generally at the center, as shown in FIGS. 2, 3 and 5A. The mounting region 24 is provided, at the center, with an opening 25 for receiving the inflator body 9*a* and admitting an inflation gas, and a periphery of the opening 25 serves as a mounting seat 26 for mounting on the case 11. The case 11 is mounted on the steering wheel body 1 as the vehicle body. That is, the mounting seat 26 of the vehicle-side wall 22 is mounted on the steering wheel body 1 (i.e. the vehicle body) through the medium of the case 11. The mounting seat 26 includes a plurality of mounting holes 26*a* for receiving the bolts 7*a* of the retainer 7. Further, as can be seen in FIG. 5A and FIGS. 6 to 8, the vehicle-side wall 22 is provided with at least one (two, in the illustrated embodiment) vent hole 27 for releasing an extra inflation gas.

As can be seen in FIG. 6, the vehicle-side base cloth 45 is provided with four V-shaped cut-out regions 50 at positions spaced apart by 90 degrees about the opening 25. In other words, the vehicle-side base cloth 45 includes a generally square central region 47 which is disposed around the opening 25 and four outer peripheral regions 48 each of which has a generally rectangular shape and extends from each of four sides of the central region 47, and the four cut-out regions 50 are disposed between any two adjacent ones of the outer peripheral regions 48. Each of the cut-out regions 50 includes a bottom 50*a* which is disposed towards the opening 25 and a pair of opposing edges 50*b* which extend outwardly from the bottom 50*a* in a mutually facing manner. Each of the opposing edges 50*b* concurrently serves as an outer edge 48*a* of one of the outer peripheral regions 48 which is opposed to a counterpart of an adjacent outer peripheral region 48. The vehicle-side wall 22 is formed by closing each of these cut-out regions 50. To describe more specifically, the opposing edges 50*b* of each of the cut-out regions 50 (i.e. an outer edge 48*a* of one of the outer peripheral regions 48 and a counterpart of the adjacent outer peripheral region 48) are sewn up with sewing threads 90, such that the cut-out regions 50 are closed. The vehicle-side wall 22 thus includes four shortening regions (or darts) 28 that reduce a circumferential length of an outer circumferential edge 46 of the base cloth 45. As a consequence, as can be seen in (A) of FIGS. 7 and (A) of FIG. 8, the vehicle-side wall 22 provided with the shortening regions 28 is formed into a generally round box shape in which the central region 47 of the base cloth 45 forms the bottom wall. An outer circumferential edge 23 of the vehicle-side wall 22 is formed into a generally square annular shape with rounded corners.

Since the shortening regions 28 bend the vehicle-side wall 22 and form the vehicle-side wall 22 into a three-dimensional box shape, a substantial length LD1 of a portion of the vehicle-side wall 22 from a center (central axis) XC of the opening 25 to the outer circumferential edge 23, in other words, a length (FIG. 5A) from the center (central axis) XC of the opening 25 to the outer edge 48*a* of one of the outer peripheral region 48 in the vehicle-side base cloth 45, is greater than a radius DR (FIGS. 3 and 8) of a flat disc that the outer circumferential edge 23 of the vehicle-side wall 22 forms.

The driver-side wall (i.e. occupant-side wall) 31 is composed of an occupant-side base cloth 55 depicted in FIG. 6. The occupant-side base cloth 55 as laid flat has a generally cruciate contour, and is provided with four V-shaped cut-out regions 60 at positions spaced apart by 90 degrees about the center (central axis) XC. In other words, the occupant-side base cloth 55 includes a generally square central region 57 which is disposed around the center XC and four outer peripheral regions 58 each of which has a generally rectangular (or trapezoidal) shape and extends from each of four sides of the central region 57, and the four cut-out regions 60 are disposed between any two adjacent ones of the outer peripheral regions 58. Each of the cut-out regions 60 includes a bottom 60*a* which is disposed towards the center XC and a pair of opposing edges 60*b* which extend outwardly from the bottom 60*a* in a mutually facing manner. Each of the opposing edges 60*b* concurrently serves as an outer edge 58*a* of one of the outer peripheral regions 58 which is opposed to a counterpart of an adjacent outer peripheral region 58. The driver-side wall 31 is formed by closing each of these cut-out regions 60. To describe more specifically, the opposing edges 60b of each of the cut-out regions 60 (i.e. an outer edge 58a of one of the outer peripheral regions 58 and a counterpart of the adjacent outer peripheral region 58) are sewn up with sewing threads 90, such that the cut-out regions 60 are closed. The driver-side wall 31 thus includes four shortening regions (or darts) 38 that reduce a circumferential length of an outer circumferential edge 56 of the base cloth 55. As a consequence, as can be seen in (B) of FIGS. 7 and (B) of FIG. 8, the driver-side wall 31 provided with the shortening regions 38 is formed into a box shape in which the central region 57 of the base cloth 55 forms the bottom wall. An outer circumferential edge 31b of the driver-side wall 31 is formed into a generally square annular shape with rounded corners.

Figure 5B:
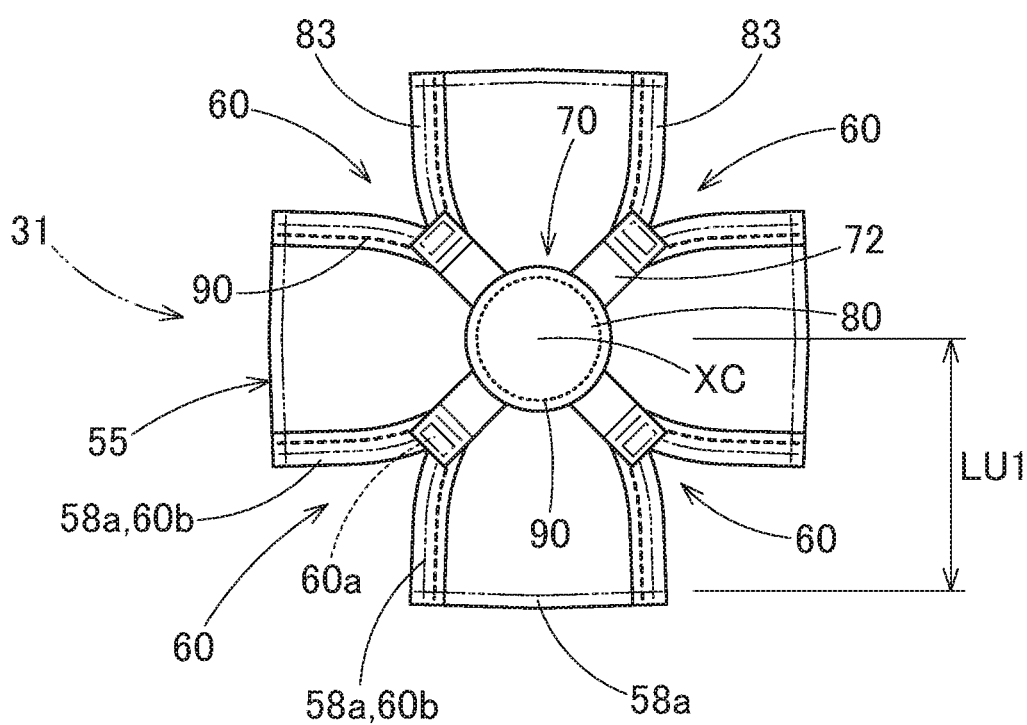
FIG. 5B is a plan view of a base cloth for forming the occupant-side wall of the airbag of FIG. 4.

Since the shortening regions 38 bend the driver-side wall 31 and form the driver-side wall 31 into a three-dimensional box shape, a substantial length LU1 (FIG. 5B) of a portion of the driver-side wall 31 from the center XC to the outer circumferential edge 31b is greater than a radius UR (FIGS. 3 and 8) of a flat disc that the outer circumferential edge 31b of the driver-side wall 31 forms.

The outer circumferential edge 23 of the vehicle-side wall 22 and the outer circumferential edge 31b of the driver-side wall 31 are equal in circumferential length. In the illustrated embodiment, the outer circumferential edge 23 and the outer circumferential edge 31b have both a generally annular shape and are equal in contour as well. The outer shell 21 of the airbag 20 is formed by sewing the outer circumferential edge 23 and the outer circumferential edge 31b together with sewing threads 90 such that the shortening regions 28 and shortening regions 38 match in position around the center XC, as can be seen in FIG. 4.

The airbag 20 further includes a plurality of (four, in the illustrated embodiment) tethers 41 that connect the driver-side wall 31 with vehicle-side wall 22 for limiting a clearance between the driver-side wall 31 and vehicle-side wall 22. The tethers 41 form a recessed region 33 for receiving the occupant's head MH in a vicinity of the center of the driver-side wall 31 as inflated, and an annular raised region 35 around the recessed region 33.

More specifically, the tethers 41 each connect a vicinity of an outer circumference 34a of a bottom plane 33 of the recessed region 33 in the driver-side wall 31 to a periphery of the mounting region 24 in the vehicle-side wall 22. These tethers 41 are arranged to match the shortening regions 28 and 38 in position around the center XC, each at 45° position from front, rear, left and right directions. A length TL (FIG. 3) of each of the tethers 41 is such that the recessed region 33 can catch the occupant's head MH on the front face and sides with the bottom plane 34 and side plane 36 at airbag deployment. In other words, the length TL of each of the tethers 41 is such as to ensure a predetermined depth Dh (FIG. 3) of the recessed region 33, i.e. a predetermined depth Dh from the top 35a of the raised region 35 to the bottom plane 34 of the recessed region 33. Yet another factor for determining the length TL of each of the tethers 41 is a height H0 (FIG. 3) of the bottom plane 34 of the recessed region 33 from the mounting region 24. The bottom plane 34 of the recessed region 33 needs to have a sufficient height from the mounting region 24 for cushioning the occupant's head MH.

In the illustrated embodiment, each of the tethers 41 is formed by joining distal ends of an upper region 41a (or occupant-side region 72) and a lower region 41b (vehicle-side region 67), which is separated from the upper region 41a, together. The occupant-side region 72 is joined to the driver-side wall 31 by the root end, the vehicle-side region 67 is joined to the vehicle-side wall 22 by the root end. As can be seen in FIG. 6, each of the occupant-side regions 72 extends from an outer circumferential edge of an occupant-side tether base cloth 70 which is joined to a vicinity of the center 31a of the driver-side wall 31, and each of the vehicle-side regions 67 extends from an outer circumferential edge of a vehicle-side tether base cloth 65 which is joined to a vicinity of the center of the vehicle-side wall 22.

In the illustrated embodiment, the occupant-side tether base cloth 70 and the vehicle-side tether base cloth 65 are made of a fabric woven with polyamide yarn, polyester yarn or the like. As can be seen in FIG. 6, the occupant-side tether base cloth 70 includes a main body 71 having a round disc shape and four occupant-side regions 72 which protrude from an outer circumferential edge 71a of the main body 71. The main body 71 is sewn to the center 31a of the driver-side wall 31 by the outer circumferential edge 71a. The joint or seam of the outer circumferential edge 71a of the main body 71 to the driver-side wall 31 forms the outer circumference 34a of the bottom plane 33 of the recessed region 33.

The vehicle-side tether base cloth 65 includes a main body 66 having an annular shape and four vehicle-side regions 67 which protrude from an outer circumferential edge 66a of the main body 66. The main body 66 is sewn to the mounting region 24 of the vehicle-side wall 22 by the outer circumferential edge 66a.

The main body 66 is provided with an opening and four mounting holes (reference numerals omitted) corresponding to the opening 25 and mounting holes 26a of the mounting region 24.

As can be seen in FIG. 2, the airbag 20 of the illustrated embodiment further includes a redirecting cloth 43 which is disposed over the opening 25 and redirects an inflation gas G as discharged from the inflator 9 forward and rearward. As can be seen in FIG. 6, the redirecting cloth 43 is composed of a redirecting base cloth 75 which is made of a fabric woven with polyamide yarn, polyester yarn or the like. The base cloth 75 includes an annular main body 76 which is sewn and joined to the mounting region 24 of the vehicle-side wall 22 and a pair of joint regions 77 which extend from left and right edges of the main body 76 and are sewn together by the leading ends 77a with sewing threads 90. The main body 76 is provided with an opening and four mounting holes (reference numerals omitted) corresponding to the opening 25 and mounting holes 26a of the mounting region 24 of the vehicle-side wall 22.

Other than the vehicle-side base cloth 45, occupant-side base cloth 55, vehicle-side tether base cloth 65, occupant-side tether base cloth 70 and redirecting base cloth 75 described above, components of the airbag 20 further include a reinforcing cloth 79 for reinforcing the mounting region 24, a reinforcing cloth 80 for reinforcing an area of the driver-side wall 31 where the main body 71 of the occupant-side tether base cloth 70 is disposed, two reinforcing cloths 85 for reinforcing the vent holes 27, a plurality of patches 82 for reinforcing the shortening regions 28 and a plurality of patches 83 for reinforcing the shortening regions 38, as can be seen in FIG. 6.

Production of the airbag 20 is now described. Firstly, a vehicle-side base cloth 45 is provided as has no opening 25, mounting holes 26a or vent holes 27 yet. Then the reinforcing cloth 79, the main body 76 of the redirecting base cloth 75 and the main body 66 of the vehicle-side tether base cloth 65 are placed on the locations of the mounting region 24, while the reinforcing cloths 85 are placed on the location of the vent holes 27, on the vehicle-side base cloth 45, and respectively sewn thereto with sewing threads 90. Then the opening 25, mounting holes 26a and vent holes 27 are punched out. The patches 82 are each sewn and joined to the opposing edges 50b of the cut-out regions 50 with sewing threads 90, as can be seen in FIG. 6. The opposing edges 50b of each of the cut-out regions 50 are then sewn together to form a shortening region 28. Thus the vehicle-side wall 22 is completed.

Figure 7:
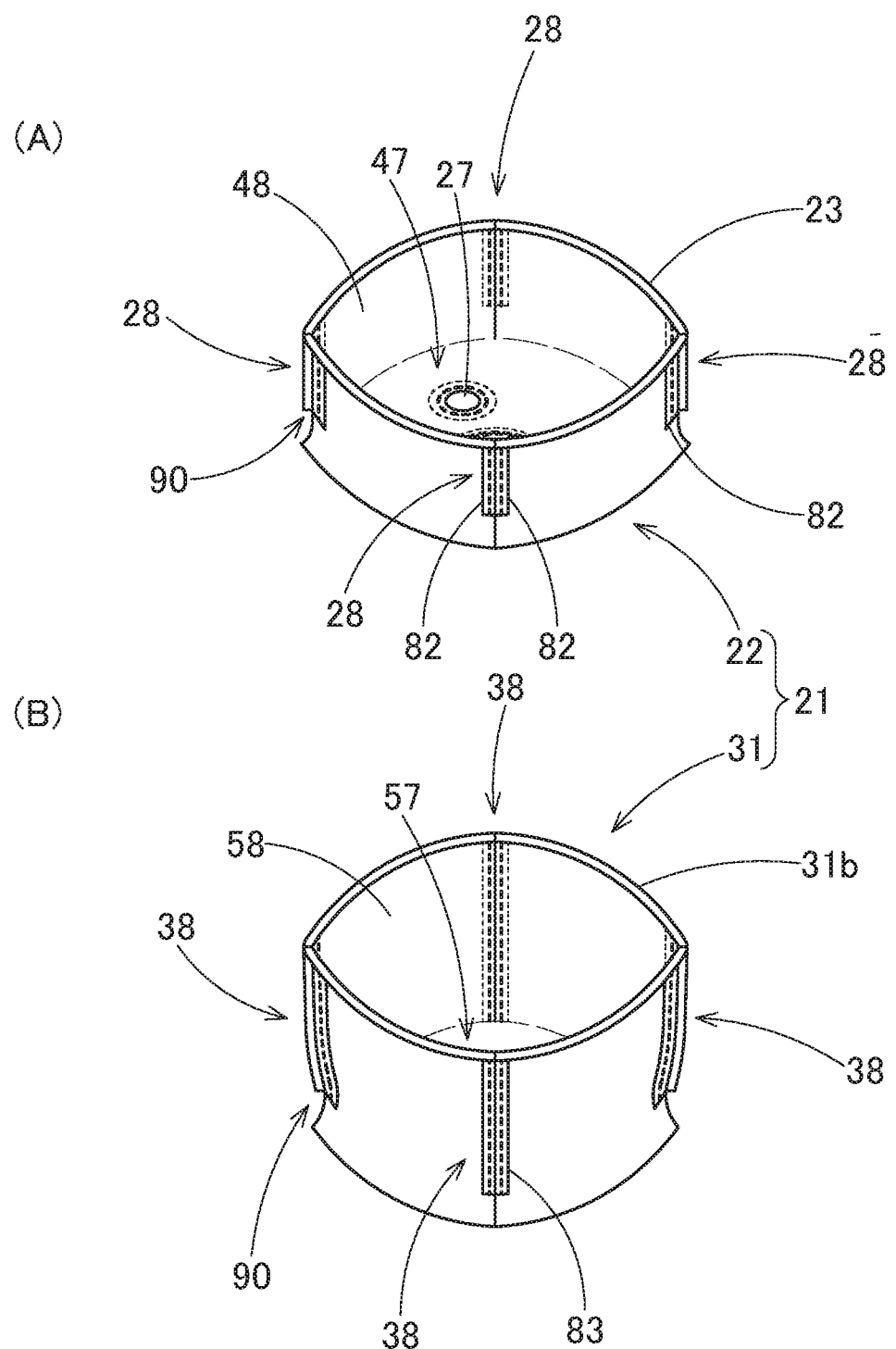
FIG. 7 shows perspective views of the vehicle-side wall and the occupant-side wall of the airbag of FIG. 4 each as provided with shortening regions, each of the vehicle-side wall and occupant-side wall being disposed inside out with the outer circumferential edge facing upwardly.
Figure 8:
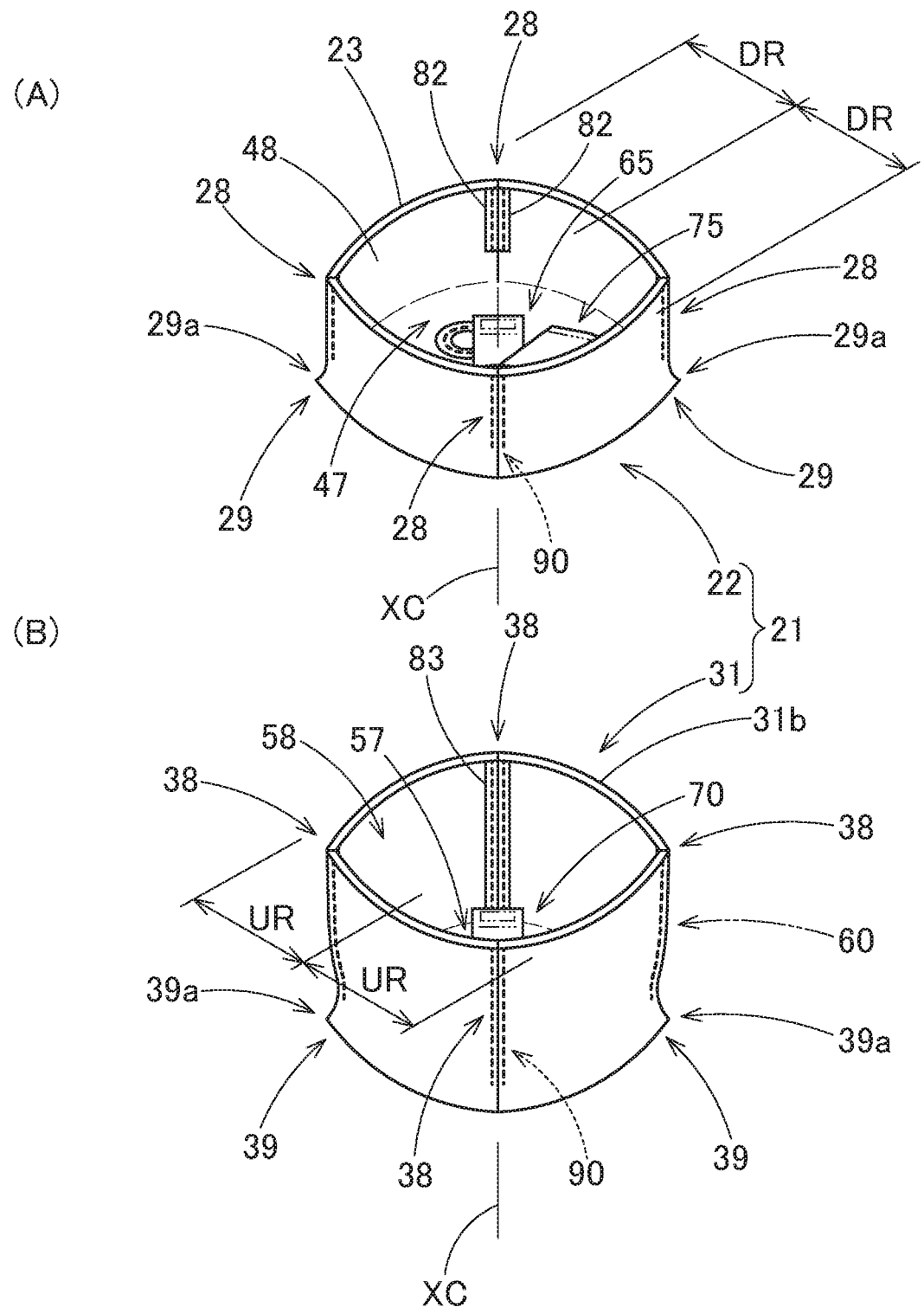
FIG. 8 shows perspective views of the vehicle-side wall and the occupant-side wall of the airbag of FIG. 4 with the outer sides facing outwardly.

At this time, as can be seen in FIGS. 7 and 8, the members such as the reinforcing cloth 79 and seam allowances of the shortening regions 28 are disposed on a side of the base cloth 45 to be an inner surface of the airbag 20.

In the meantime, an occupant-side base cloth 55 is provided, and the main body 71 of the occupant-side tether base cloth 70 is sewn to the central region 57 of the base cloth 55. The patches 83 are each sewn and joined to the opposing edges 60b of the cut-out regions 60 of the base cloth 55. The opposing edges 60b of each of the cut-out regions 60 are then sewn together to form a shortening region 38. Thus the occupant-side wall 31 is completed. In a similar manner to the vehicle-side wall 22, the tether base cloth 70 and seam allowances of the shortening regions 38 are disposed on a side of the base cloth 55 to be an inner surface of the airbag 20, as can be seen in FIGS. 7 and 8.

Subsequently, the vehicle-side wall 22 and driver-side wall 31 are mated with the outer surfaces facing inward and sewn together by the outer circumferential edges 23 and 31b. The airbag 20 is then reversed inside out via the opening 25, the vehicle-side regions 67 and occupant-side regions 72 of the tether base cloths 65 and 70 are taken out of the opening 25, and mating sets of the vehicle-side region 67 and occupant-side region 72 are each sewn together to form the tethers 41. The completed tethers 41 are put back into the airbag 20. Likewise, the joint regions 77 of the redirecting base cloth 75 are taken out of the opening 25, joined together, then put back into the airbag 20. The airbag 20 is thus completed.

To assemble the airbag device M, the retainer 7 is housed inside the airbag 20 such that the bolts 7a of the retainer 7 project out of the mounting holes 26a, and then the airbag 20 is folded up. The airbag 20 is then wrapped up by a predetermined member for keeping the folded-up configuration. Then the airbag 20 is set on the bottom wall 11a of the case 11 such that the bolts 7a of the retainer 7 go through the through holes 11c. Subsequently, the body 9a of the inflator 9 is set in the insert hole 11b of the bottom wall 11a and opening 25 of the airbag 20 from the lower side such that the bolts 7a of the retainer 7 go through the through holes 9d of the flange 9c. If the bolts 7a of the retainer 7 are then fastened with not-shown nuts, the airbag 20 and the inflator 9 are set in and secured to the case or housing 11, with the aid of the retainer 7. Thereafter, the airbag cover 15 is placed over the case 11 and the side wall 11d of the case 11 and the side wall 17 of the airbag cover 15 are joined together through the use of rivets 14 or the like, thus the airbag cover 15 is mounted on the case 11. If then the horn switch mechanisms 13 are attached to the mounting pieces 11e of the case 11, the airbag device M is completed. Then the mounting bases 13a of the horn switch mechanisms 13 are used to mount the airbag device M on the steering wheel body 1, which has been mounted on the steering shaft SS in advance. Thus the airbag device M is mounted on the vehicle.

When the airbag device M is actuated and an inflation gas G is fed to the airbag 20 via the opening 25, the airbag 20 will be inflated and push and open the doors 16a of the airbag cover 15. Then the airbag 20 will protrude out of the case 11 and be deployed over the top plane PR of the rim R and spokes S of the steering wheel W, as can be seen in FIG. 1 (double-dotted lines) and FIGS. 2 and 3. The airbag 20 as inflated will be supported by the top plane PR of the steering wheel W, thus completing deployment.

When, by way of example, the driver MD moves diagonally forward and the head MH of the driver MD is thrown into the recessed region 33 in the event of an offset collision or the like, the airbag 20 catches the front face of the head MH with the bottom plane 34 of the recessed region 33 and catches the sides of the head MH with the side plane 36 of the raised region 35, thus preventing the head MH from turning sideways and protecting the head MH adequately, as indicated with double-dotted lines in FIG. 3.

In the airbag 20 of the illustrated embodiment, each of the vehicle-side wall 22 and occupant-side wall 31 is provided, in the outer edge 23/31b, with the shortening regions 28/38 each of which reduce the circumferential length of the outer circumferential edge 46/56 of the vehicle-side base cloth 45/occupant-side base cloth 55. The shortening regions 28 bend the vehicle-side base cloth 45 and keep the substantial length LD1 (FIG. 5A) from the center (central axis) XC to the outer edge 23 long while the shortening regions 38 bend the occupant-side base cloth 55 and keep the substantial length LU1 (FIG. 5B) from the center (central axis) XC to the outer edge 31b long. That is, by reducing the circumferential lengths of the outer circumferential edges 46 and 56 of the vehicle-side base cloth 45 and occupant-side base cloth 55, the shortening regions 28 and 38 limit an outer diameter DO (FIG. 3) of the airbag 20 as inflated, without reducing the substantial lengths LD1 and LU1 (FIGS. 5A and 5B) from the center XC to the outer edges 23 and 31b in the occupant-side wall 31 and vehicle-side wall 22. Here, the outer diameter DO of the airbag 20 as inflated is generally twice as great as the radius UR of the flat disc that the outer circumferential edge 31b of the driver-side wall 31 forms/the radius DR of the flat disc that the outer circumferential edge 23 of the vehicle-side wall 22 forms. The airbag 20 thus configured is given a sufficient height H1 from the mounting region 24 to the top 35a of the raised region 35 when inflated, as shown in FIG. 3. Moreover, since the recessed region 33 is formed in the airbag 20 having the great height H1, a sufficient height Dh of the raised region 35 (i.e. a depth of the recessed region 33) is also ensured. With this configuration, when a head MH of a driver MD is thrown into the recessed region 33, the airbag 20 will be able to restrain the front face and sides of the head MH smoothly with the recessed region 33 and raised region 35. As a consequence, the airbag 20 will be able to protect the head MH adequately without turning the head MH sideways.

In the airbag 20 of the illustrated embodiment, the tethers 41 connect the driver-side wall 31 and vehicle-side wall 22 vertically, i.e. along the height of the airbag 20 as inflated. In comparison with a conventional airbag which is provided with not only vertical tethers such as the tethers 41 but also transverse tethers disposed orthogonally thereto, the airbag 20 includes the tethers 41 only, thus the configuration of the airbag 20 is simple. Further, the number of the tethers 41 is also limited. Accordingly, it is easy to form the tethers 41 as well as produce the airbag 20.

Therefore, the airbag 20 of the illustrated embodiment has a sufficient height or thickness H1 as inflated despite the presence of the recessed region 33 for receiving an occupant's head MH, and is easy to produce.

In the airbag 20 of the illustrated embodiment, especially, both of the occupant-side wall 31 and the vehicle-side wall 22 are provided with the shortening regions 38 and 28.

With this configuration, the substantial length LD1, LU1 from the center (central axis) XC to the outer edge 23, 31b is made long relative to a given outer diameter DO of the airbag 20 as inflated in both of the occupant-side wall 31 and the vehicle-side wall 22, such that the height H1 of the airbag 20 as inflated will be further increased. Therefore, the airbag 20 will have a sufficient thickness for cushioning an occupant's head when inflated despite the presence of the recessed region 33 and the raised region 35 disposed around the recessed region 33.

Figure 10:
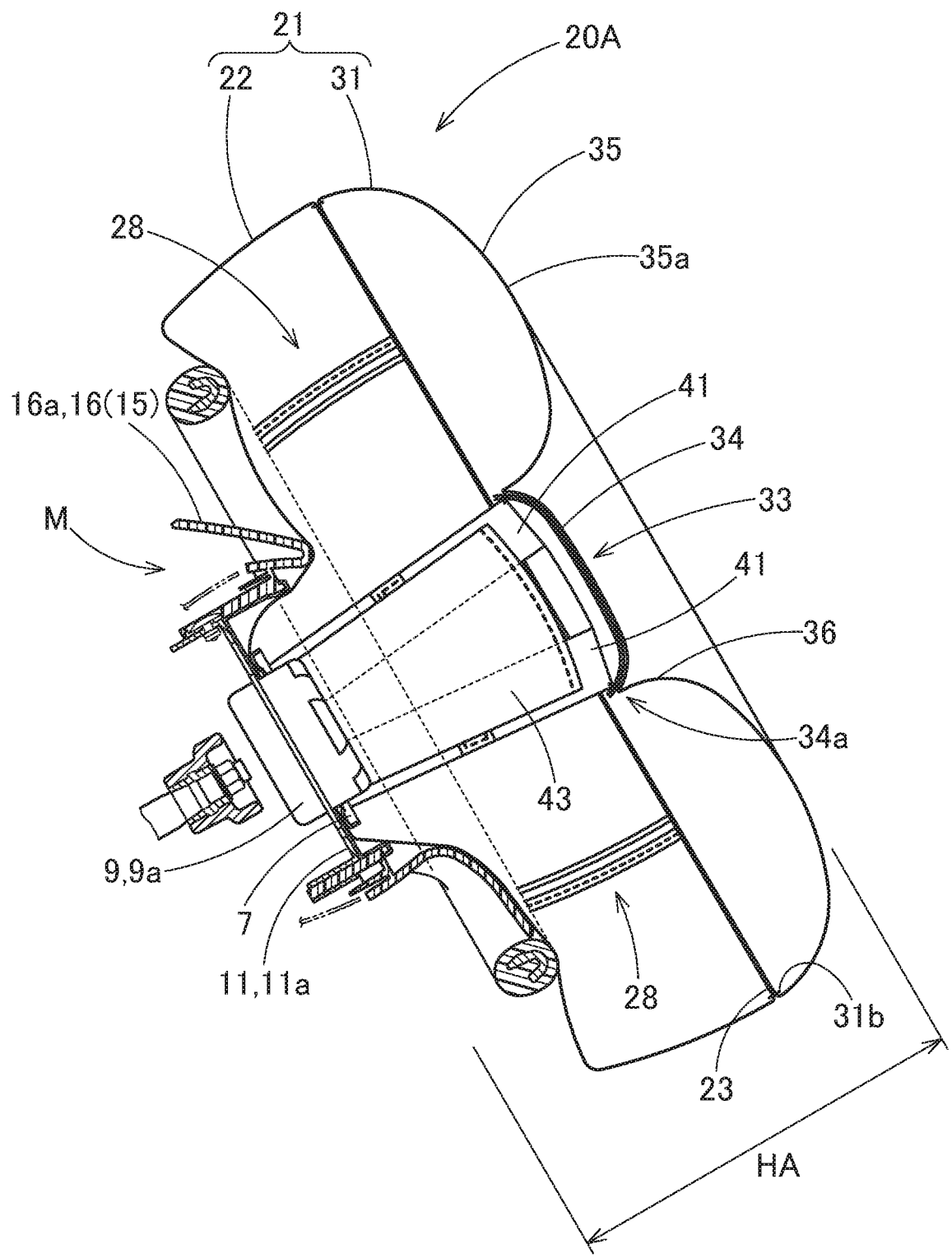
FIG. 10 is a schematic vertical sectional view of an airbag device for a driver's seat which employs a modification of the airbag, as actuated.
Figure 12:
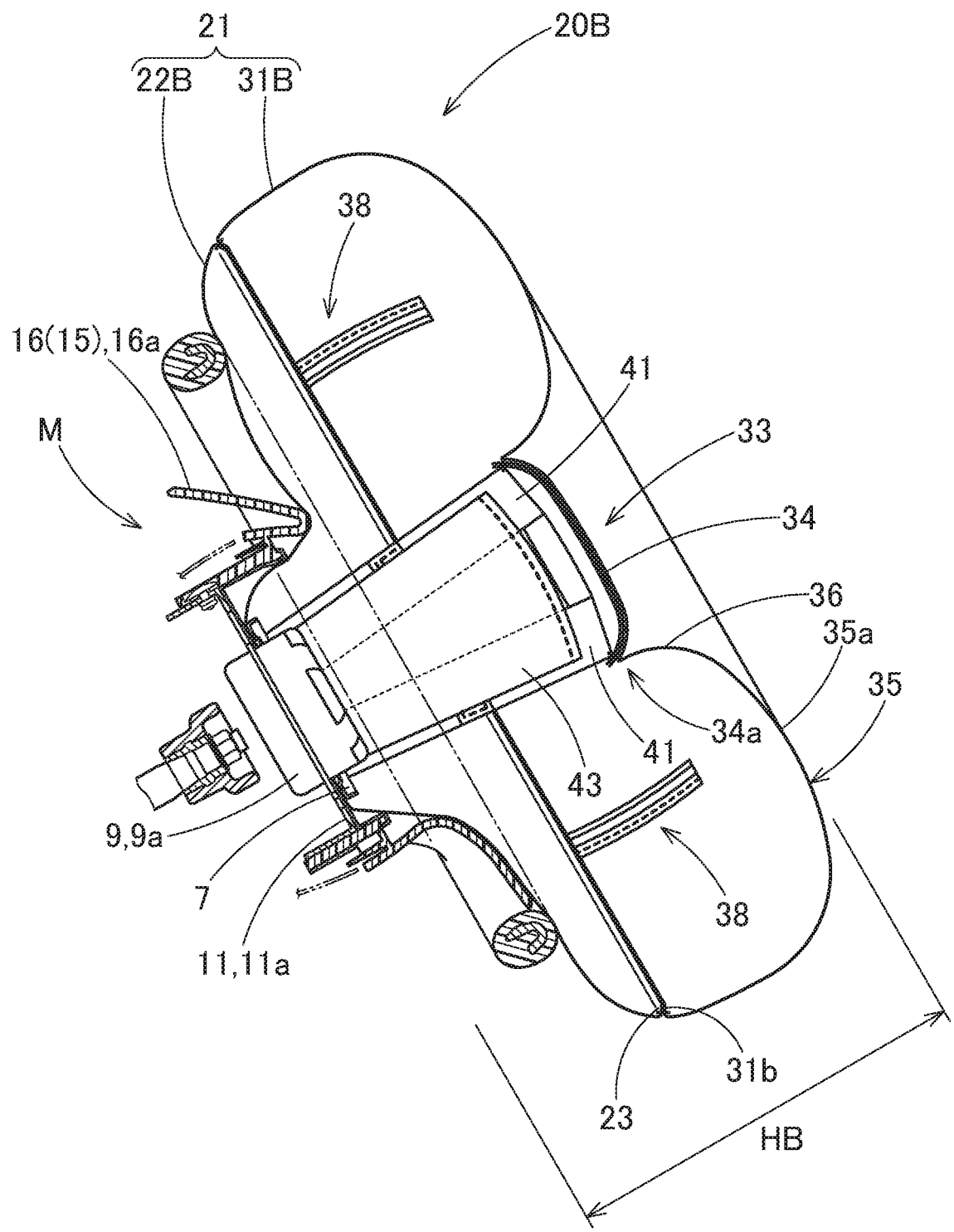
FIG. 12 is a schematic vertical sectional view of an airbag device for a driver's seat which employs another modification of the airbag, as actuated.

If such an advantageous effect does not have to be considered, it would also be conceivable to provide the shortening region to only either one of the occupant-side wall and vehicle-side wall, as in an airbag 20A depicted in FIG. 10 and an airbag 20B depicted in FIG. 12.

Figure 11:
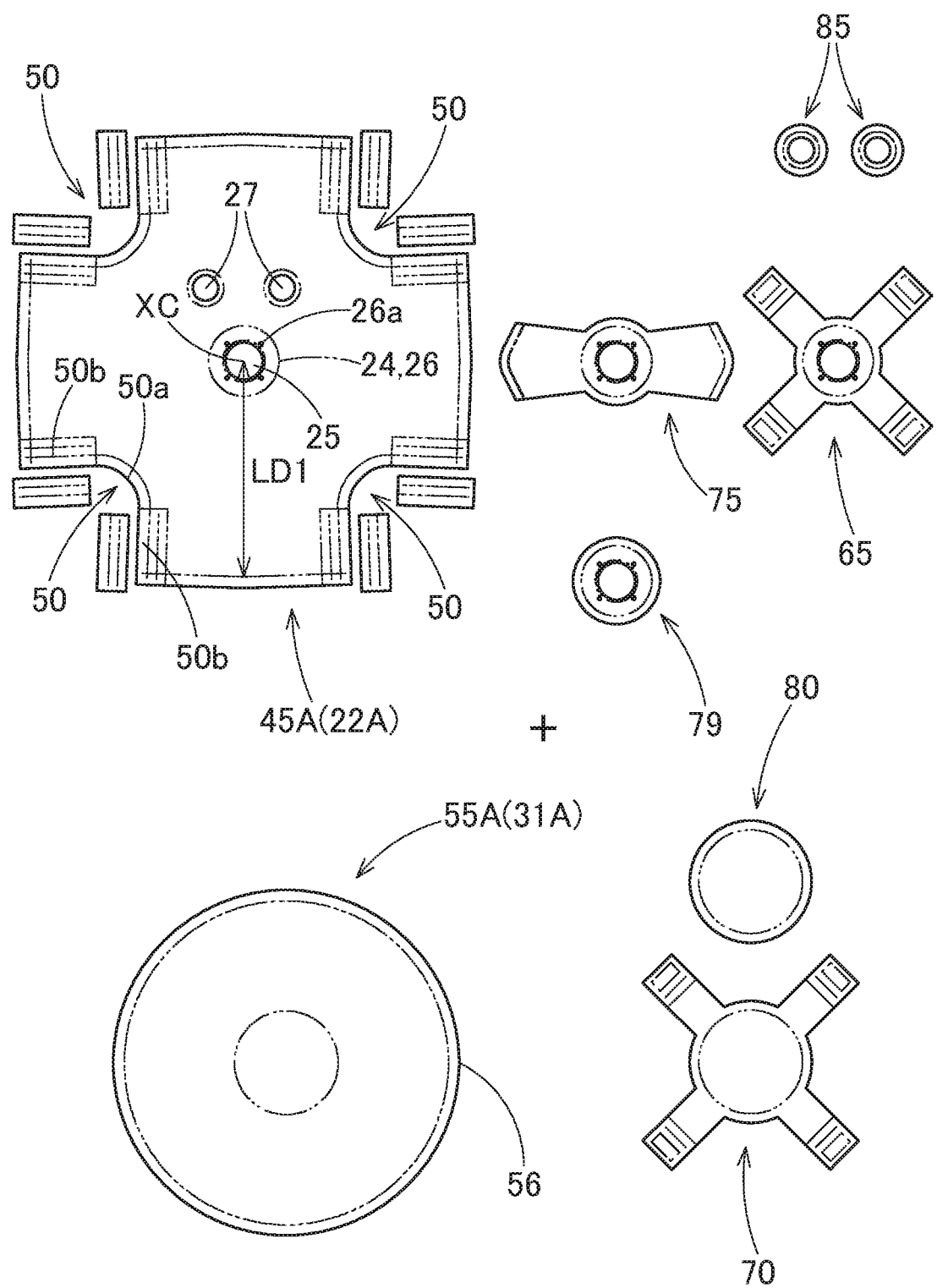
FIG. 11 depicts components of the airbag of FIG. 10 by plan views.

The airbag 20A depicted in FIG. 10 is formed by joining together outer circumferential edges of a vehicle-side wall 22A and a driver-side wall 31A. The vehicle-side wall 22A is composed of a vehicle-side base cloth 45A which has a similar configuration to that of the vehicle-side base cloth 45 of the foregoing embodiment, as can be seen in FIG. 11. Specifically, the vehicle-side base cloth 45A is provided with four V-shaped cut-out regions 50. That is, the vehicle-side wall 22A includes four shortening regions 28 each of which is formed by sewing opposing edges 50b of one of the cut-out regions 50. The driver-side wall 31A is composed of an occupant-side base cloth 55A which has a disc shape. That is, the driver-side wall 31A has no shortening regions.

A circumferential length of an outer edge 31b of the disc-shaped driver-side wall 31A having no shortening regions equals to a circumferential length of an outer edge 23 of the vehicle-side wall 22A provided with the shortening regions 28. Thus the airbag 20A can be formed by sewing the outer circumferential edges 23 and 31b of the vehicle-side wall 22A and driver-side wall 31A together by a production process similar to that of the foregoing embodiment.

Figure 13:
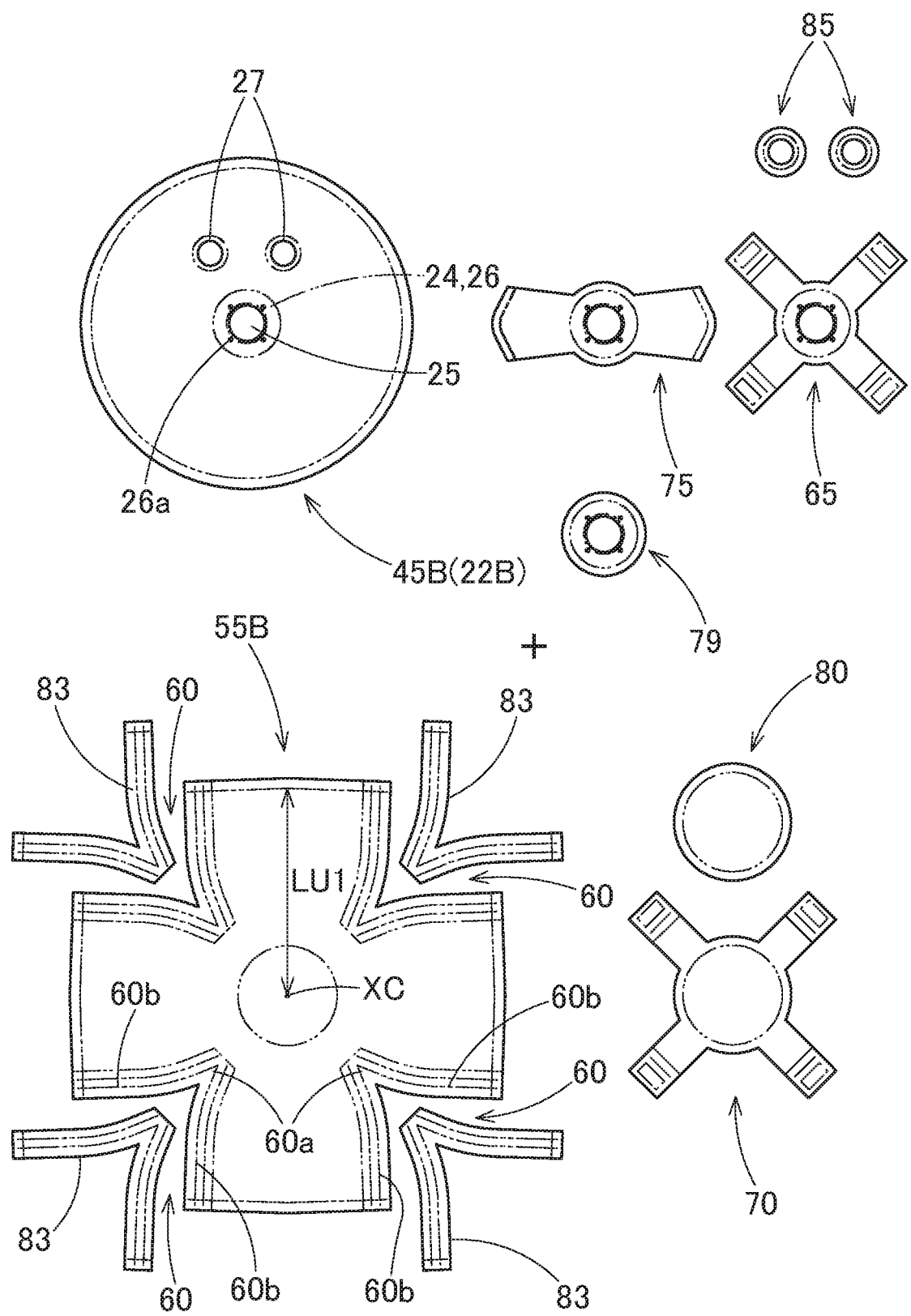
FIG. 13 depicts components of the airbag of FIG. 12 by plan views.

The airbag 20B depicted in FIG. 12 is formed by joining together outer circumferential edges of a vehicle-side wall 22B and a driver-side wall 31B. The driver-side wall 31B is composed of an occupant-side base cloth 55B which has a similar configuration to that of the occupant-side base cloth 55 of the foregoing embodiment, as can be seen in FIG. 13. Specifically, the occupant-side base cloth 55B is provided with four V-shaped cut-out regions 60. That is, the occupant-side wall 31B includes four shortening regions 38 each of which is formed by sewing opposing edges 60b of one of the cut-out regions 60. The vehicle-side wall 22B is composed of a vehicle-side base cloth 45B which has a disc shape. That is, the vehicle-side wall 22B has no shortening regions.

A circumferential length of an outer edge 31b of the driver-side wall 31B provided with the shortening regions 38 equals to a circumferential length of an outer edge 23 of the vehicle-side wall 22B having no shortening regions. Thus the airbag 20B can be formed by sewing the outer circumferential edges 23 and 31b of the vehicle-side wall 22B and driver-side wall 31B together by a production process similar to that of the foregoing embodiment.

In the airbag 20A and 20B, the shortening regions 28 and 38 each bend the vehicle-side wall 22A and the occupant-side wall 31B, thus make substantial lengths LD1 (FIG. 11) and LU1 (FIG. 13) from the center XC to the outer edge 23/31b in the wall 22A/31B long relative to a given outer diameter of the airbag 20A/20B as inflated. The airbags 20A and 20B thus configured are each given a sufficient height HA (FIG. 10), HB (FIG. 12) from the mounting region 24 to the top 35a of the raised region 35 when inflated. Moreover, since the recessed region 33 is formed in the airbag 20A/20B having the sufficient height HA/HB, a sufficient height of a raised region 35 (i.e. a depth of the recessed region 33) is also ensured. With this configuration, when a head MH of an occupant MD is thrown into the recessed region 33, each of the airbags 20A and 20B will be able to restrain the front face and sides of the head MH smoothly with the recessed region 33 and raised region 35. As a consequence, the airbags 20A and 20B will be able to protect the head MH adequately without turning the head MH sideways.

In the airbag 20A and 20B, the tethers 41 connect the driver-side wall 31A/31B and vehicle-side wall 22A/22B vertically, i.e. along the height of the airbag as inflated. In comparison with a conventional airbag which is provided with not only vertical tethers but also transverse tethers disposed orthogonally thereto, the airbags 20A and 20B each include the tethers 41 only, and the number of the tethers 41 is also limited. Accordingly, it is easy to form the tethers 41 as well as produce the airbag 20A/20B.

Therefore, each of the airbags 20A and 20B has a sufficient height or thickness HA/HB as inflated despite the presence of the recessed region 33 for receiving an occupant's head MH, and is easy to produce.

In the airbag 20 of the foregoing embodiment, four (i.e. a plurality of) shortening regions 38 are disposed around the recessed region 33 in the driver-side wall (i.e. occupant-side wall) 31. The base cloth 55 of the occupant-side wall 31 includes four (a plurality of) V-shaped cut-out regions 60 each of which includes the bottom 60a and a pair of the opposing edges 60b that extend from the bottom 60a to the outer circumferential edge 56 of the base cloth 55, and each of the shortening regions 38 is formed by joining the opposing edges 60b of each of the cut-out regions 60. The joint of each of the tethers 41 to the occupant-side wall 31, i.e. the outer edge 71a (FIG. 6) of the main body 71 of the occupant-side base cloth 70, is disposed proximate to the bottom 60a of the cut-out region 60 in each of the shortening regions 38, as shown in FIGS. 9A and 9B.

Figure 9A:
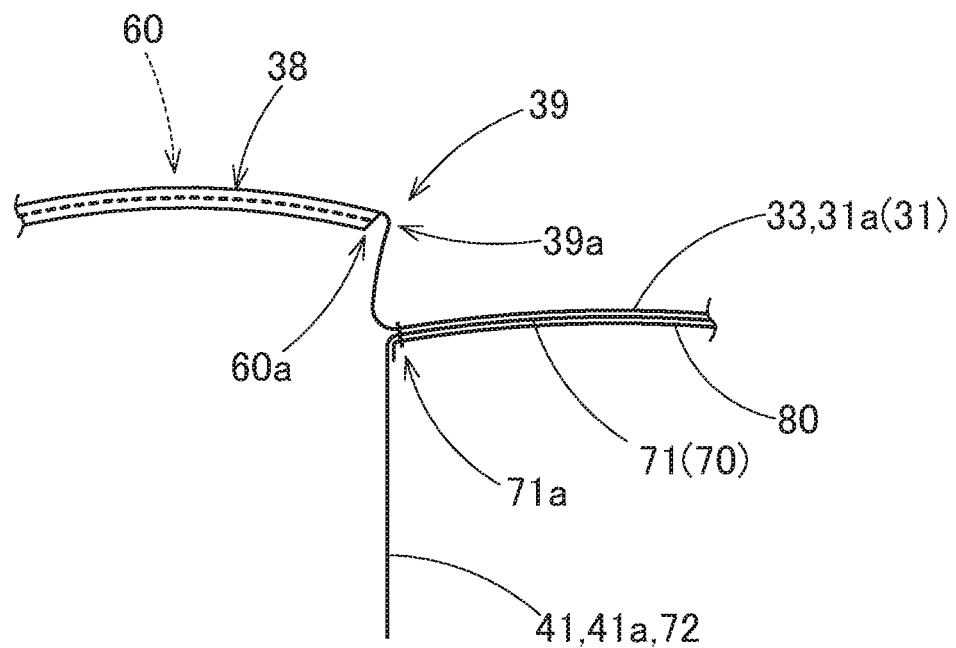
FIG. 9A illustrates a projection which is formed in a vicinity of the bottom of a cut-out region as a result of forming a shortening region in the occupant-side wall (or in the vehicle-side wall)
Figure 9B:
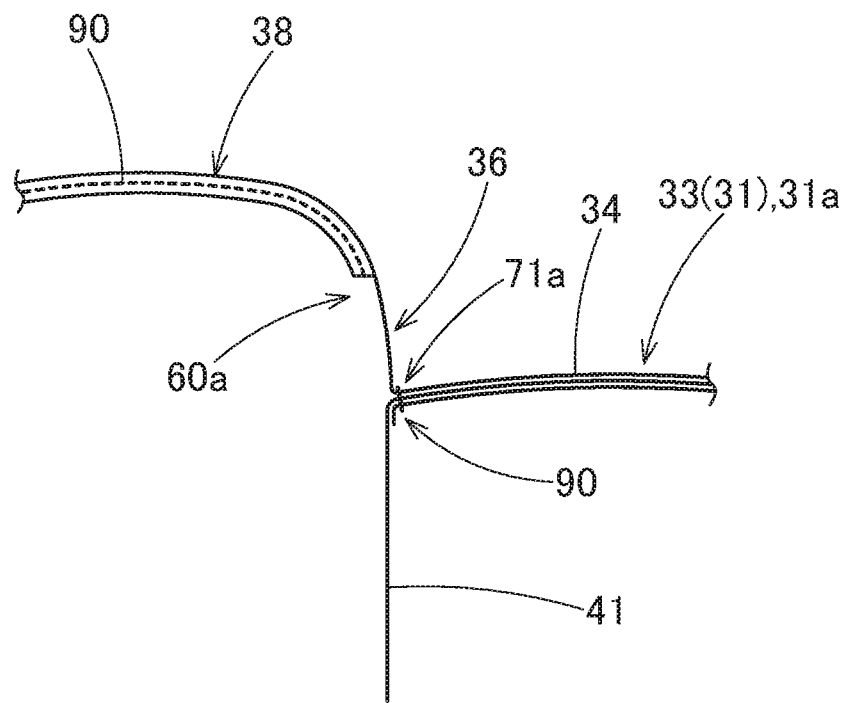
FIG. 9B illustrates the way a protruding amount of the projection of FIG. 9A is suppressed at inflation of the airbag.

When the shortening region 38 is formed by sewing the opposing edges 60b of the V-shaped cut-out region 60 in the driver-side wall 31, the bottom 60a of the cut-out region 60 is likely to form a projection 39 which protrudes outwardly like a pointed cone, as can be seen in FIGS. 9A and (B) of FIG. 8. When the airbag 20 is inflated, the projections 39 are likely to appear in the periphery of the recessed region 33. However, since the upper region 41a (i.e. the occupant-side region 72) of each of the tethers 41 is joined proximate to the bottom 60a of the cut-out region 60, each of the tethers 41 will pull the driver-side wall 31 at airbag deployment such that a protruding amount of each of the projections 39 is suppressed, as can be seen in FIG. 9B. As a consequence, the projections 39 will be less represented at airbag deployment, thus will not harm the head MH of the occupant MD when the recessed region 33 receives it.

In the airbag 20 of the illustrated embodiment, as shown in FIGS. 4 and (A) of FIG. 8, an area around the bottom 50a of the cut-out region 50 of each of the shortening regions 28 of the vehicle-side wall 22 forms a projection 29 protruding like a cone.

In the airbag of the illustrated embodiment, each of the tethers 41 is formed by joining leading ends of the occupant-side region 72 which is joined to the driver-side wall (i.e. occupant-side wall) 31 and the vehicle-side region 67 which is joined to the vehicle-side wall 22. Each of the occupant-side regions 72 is so formed as to extend from the outer edge 71a of the main body 71 of the occupant-side tether base cloth 70 which main body 71 is joined to the vicinity of the center 31a of the driver-side wall 31. Each of the vehicle-side regions 67 is so formed as to extend from the outer edge 66a of the main body 66 of the vehicle-side tether base cloth 65 which main body 66 is joined to a vicinity of the center of the vehicle-side wall 22.

When the airbag 20 is produced, the vehicle-side wall 22 and driver-side wall (i.e. occupant-side wall) 31 are firstly prepared by forming the shortening regions 28, 38 in the vehicle-side base cloth 45 and the occupant-side base cloth 55. Then the vehicle-side tether base cloth 65 is joined to the vehicle-side wall 22 while the occupant-side tether base cloth 70 is joined to the driver-side wall 31, then the driver-side wall 31 and vehicle-side wall 22 are sewn together by the outer circumferential edges 23 and 31b with the outer surfaces facing inward. Subsequently, the airbag 20 is reversed inside out via the opening 25, the vehicle-side regions 67 and occupant-side regions 72 of the tether base cloths 65 and 70 are taken out of the opening 25, and mating sets of the vehicle-side region 67 and occupant-side region 72 are each sewn together to form the tethers 41. The completed tethers 41 are put back into the airbag 20. That is, the airbag 20 of the illustrated embodiment can be easily produced through the process described above although it includes the tethers 41 for forming the recessed region 33.

Although the airbag 20 of the illustrated embodiment includes four tethers 41, the number of the tethers should not be limited thereby. As long as the tethers are evenly arranged around the recessed region 33 so as to form a recessed region 33 and an annular raised region 35 around the recessed region 33, the number of the tethers may be adequately reduced or increased to three, five, six or the like.

The foregoing embodiments including alternative embodiments have been described as the invention is applied to an airbag 20/20A/20B for a driver's seat. However, the present invention can also be applied to an airbag for use in an airbag device for a passenger seat which is mounted on an instrument panel disposed in front of the passenger seat.

What is claimed is:

1. An airbag adapted to be mounted on a vehicle, comprising:
    an outer shell that is formed by joining outer circumferential edges of an occupant-side wall and a vehicle-side wall each made of a base cloth having flexibility, the occupant-side wall and the vehicle-side wall being equal in circumferential length of the outer circumferential edge, wherein the vehicle-side wall includes an opening that is disposed in a vicinity of a center of the vehicle-side wall for receiving an inflation gas, and a mounting region that is disposed in a periphery of the opening to be mounted on the vehicle;
    a recessed region that is disposed in a vicinity of a center of the occupant-side wall as inflated adapted to receive a head of a vehicle occupant;
    a raised region that is raised in an annular shape in a circumference of the recessed region in the occupant-side wall as inflated;
    a plurality of tethers that limit a clearance between the occupant-side wall and the vehicle-side wall, the tethers connecting a circumference of the mounting region in the vehicle-side wall and the occupant-side wall, thus forming a bottom plane of the recessed region in the occupant-side wall as inflated; and
    shortening regions, each shortening region of the shortening regions is disposed in at least one of the occupant-side wall and the vehicle-side wall, the each shortening region reducing the circumferential length of the outer circumferential edge of the base cloth of the at least one of the occupant-side wall and the vehicle-side wall, wherein
    the vehicle-side wall includes a first plurality of the shortening regions in the outer circumferential edge of the vehicle-side wall,
    the occupant-side wall includes a second plurality of the shortening regions in the outer circumferential edge of the occupant-side wall, the shortening regions in the occupant-side wall are disposed around the recessed region,
    the base cloth of each of the occupant-side wall and the vehicle-side wall includes a plurality of V-shaped cut-out regions, each of the cut-out regions includes a bottom and a pair of opposing edges that extend from the bottom to the outer circumferential edge of the base cloth,
    the each shortening region is formed by joining the opposing edges of a respective one of the cut-out regions, and
    a joint of each of the tethers to the occupant-side wall is disposed proximate to the bottom of the cut-out region in the each of the shortening regions.

2. The airbag of claim 1, wherein
the base cloth of the vehicle-side wall includes a generally square central region in which the mounting region is disposed and four outer peripheral regions, the central region includes four sides, each of the outer peripheral regions extends from each of the four sides of the central region in a generally rectangular shape, and the cut-out regions of the vehicle-side wall are disposed between respective adjoining edges of the outer peripheral regions of the vehicle-side wall;
the base cloth of the occupant-side wall includes a generally square central region and four outer peripheral regions, the central region includes four sides, each of the four outer peripheral regions extends from each of the four sides of the central region in a generally trapezoidal shape expanding outwardly, and the cut-out regions of the occupant-side wall are disposed between respective adjoining edges of the outer peripheral regions of the occupant-side wall.

* * * * *